US011003652B1

(12) United States Patent
Li et al.

(10) Patent No.: US 11,003,652 B1
(45) Date of Patent: May 11, 2021

(54) MULTI-WRITE DATABASE MODIFICATION

(71) Applicant: INTERNATIONAL BUSINESS MACHINES CORPORATION, Armonk, NY (US)

(72) Inventors: Shuo Li, Beijing (CN); Xiaobo Wang, Beijing (CN); ShengYan Sun, Beijing (CN); Peng Hui Jiang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/741,914

(22) Filed: Jan. 14, 2020

(51) Int. Cl.
*G06F 17/00* (2019.01)
*G06F 16/23* (2019.01)

(52) U.S. Cl.
CPC .................... *G06F 16/2343* (2019.01)

(58) Field of Classification Search
CPC .................................................. G06F 16/2343
See application file for complete search history.

(56) References Cited

U.S. PATENT DOCUMENTS

| | | | | |
|---|---|---|---|---|
| 4,965,719 A * | 10/1990 | Shoens | ...................... | G06F 9/52 707/E17.007 |
| 8,291,269 B1 * | 10/2012 | Ro | ...................... | G06F 11/1446 714/49 |
| 9,817,703 B1 | 11/2017 | Ryland | | |
| 10,235,404 B2 | 3/2019 | Reddy | | |
| 2006/0212573 A1 | 9/2006 | Loaiza | | |
| 2011/0131193 A1 * | 6/2011 | Pasupuleti | .......... | G06F 16/2336 707/704 |

OTHER PUBLICATIONS

Distributed locks with Redis; https://redis.io/topics/distlock; retrieved from the Internet Sep. 23, 2019; 8 pages.

* cited by examiner

*Primary Examiner* — Syed H Hasan
(74) *Attorney, Agent, or Firm* — Schmeiser, Olsen & Watts; Stephanie Carusillo

(57) ABSTRACT

A method, system, and program product for modifying a high performance multi-write database is provided. The method includes registering data pages configured for reading by a first node within a buffer pool structure of a database. Share lock functionality is enabled. The share lock functionality is disabled after the first node has completed reading the data pages and the data pages are registered with respect to a second node for writing functionality. A notification indicating that a group of data pages has expired is generated and transmitted to the second node. Exclusive lock functionality for allowing the second node to read and modify the data pages is enabled and after the modification the exclusive lock functionality is disabled. Reading functionality is enabled for the first and second nodes to read the group of data pages from a high performance cache structure of the buffer pool structure.

20 Claims, 12 Drawing Sheets

MULTI-WRITE DATABASE MODIFICATION

BACKGROUND

The present invention relates generally to a method for modifying a multi-write database and in particular to a method and associated system for improving database technology associated with enabling software functionality for ready and modifying data pages associated with a plurality of nodes with respect to a high performance cache structure of a buffer pool structure.

SUMMARY

A first aspect of the invention provides a high performance multi-write database modification method comprising: registering, by a processor of a database controller, data pages configured for reading by a first node of plurality of nodes within a buffer pool structure of a database; enabling, by the processor, share lock functionality configured to allow only the first node to modify the data pages; enabling, by processor, the first node to read the data pages; after the first node has completed reading the data pages, disabling by the processor, the share lock functionality; registering, by the processor, the data pages with respect to a second node of the plurality of nodes for writing functionality within the buffer pool structure; generating, by the processor, a notification indicating that a group of data pages of the data pages has expired with respect to a specified timeframe; transmitting, by the processor to the second node, the notification; enabling, by the processor, exclusive lock functionality configured to allow only the second node to read and modify the data pages; after the second node has completed modifying the data pages, disabling by the processor, the exclusive lock functionality; and enabling, by the processor, reading functionality for the first node and the second node to read the group of data pages from a high performance cache structure of the buffer pool structure.

A second aspect of the invention provides a computer program product, comprising a computer readable hardware storage device storing a computer readable program code, the computer readable program code comprising an algorithm that when executed by a processor of a database controller implements a high performance multi-write database modification method, the method comprising: registering, by the processor, data pages configured for reading by a first node of plurality of nodes within a buffer pool structure of a database; enabling, by the processor, share lock functionality configured to allow only the first node to modify the data pages; enabling, by processor, the first node to read the data pages; after the first node has completed reading the data pages, disabling by the processor, the share lock functionality; registering, by the processor, the data pages with respect to a second node of the plurality of nodes for writing functionality within the buffer pool structure; generating, by the processor, a notification indicating that a group of data pages of the data pages has expired with respect to a specified timeframe; transmitting, by the processor to the second node, the notification; enabling, by the processor, exclusive lock functionality configured to allow only the second node to read and modify the data pages; after the second node has completed modifying the data pages, disabling by the processor, the exclusive lock functionality; and enabling, by the processor, reading functionality for the first node and the second node to read the group of data pages from a high performance cache structure of the buffer pool structure.

A third aspect of the invention provides a database controller comprising a processor coupled to a computer-readable memory unit, the memory unit comprising instructions that when executed by the processor implements a high performance multi-write database modification method comprising: registering, by the processor, data pages configured for reading by a first node of plurality of nodes within a buffer pool structure of a database; enabling, by the processor, share lock functionality configured to allow only the first node to modify the data pages; enabling, by processor, the first node to read the data pages; after the first node has completed reading the data pages, disabling by the processor, the share lock functionality; registering, by the processor, the data pages with respect to a second node of the plurality of nodes for writing functionality within the buffer pool structure; generating, by the processor, a notification indicating that a group of data pages of the data pages has expired with respect to a specified timeframe; transmitting, by the processor to the second node, the notification; enabling, by the processor, exclusive lock functionality configured to allow only the second node to read and modify the data pages; after the second node has completed modifying the data pages, disabling by the processor, the exclusive lock functionality; and enabling, by the processor, reading functionality for the first node and the second node to read the group of data pages from a high performance cache structure of the buffer pool structure.

The present invention advantageously provides a simple method and associated system capable of accurately modifying a multi-write database.

DETAILED DESCRIPTION

Figure 1:
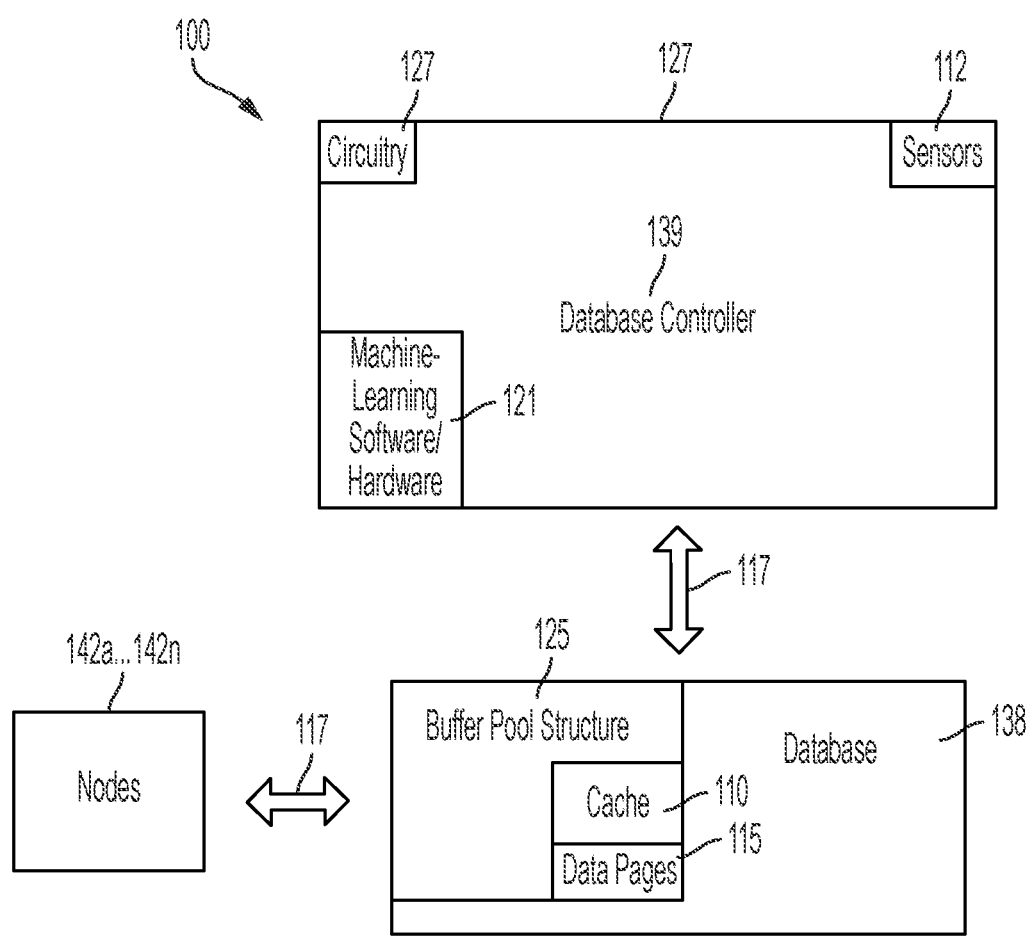
FIG. 1 illustrates a system for improving database technology associated with enabling software functionality for ready and modifying data pages associated with a plurality of nodes with respect to a high performance cache structure of a buffer pool structure, in accordance with embodiments of the present invention.

FIG. 1 illustrates a system 100 for improving database technology associated with enabling software functionality for ready and modifying data pages 115 associated with a plurality of nodes 142 . . . 142n with respect to a high performance cache structure of a buffer pool structure 125, in accordance with embodiments of the present invention. System 100 addresses issues associated with a data cache requirement associated with a distribution database. Typical data cache requirements are associated with multiple key value database requirements used for distribution database processes and therefore key value database distribution processes become critical with respect to multi-write database structures. Current solutions are not optimized with respect to multi-write processes associated with high-performance key value database structures. System 100 is configured to enable a high performance multi-write process associated with a key value database. Therefore, system 100 is enabled to improve a write process for data pages of a database and allow for a large scale execution with respect to a key value database.

System 100 enables a high performance multi-write process associated with the following critical factors for preserving data integrity:
1. Inter-system concurrency control associated with global locking hardware/software processes.
2. Inter-system record coherency control associated with managing changed data with respect to a high performance information global record exchange buffer.

System 100 of FIG. 1 includes a database controller 139 (i.e., specialized hardware device), a database 138, and a nodes 142a . . . 142n (e.g., specialized hardware and software) interconnected through a network 117. Database controller 139 includes specialized circuitry 127 (that may include specialized software), sensors 112, and machine-learning software code/hardware structure 121 (i.e., including machine-learning software code). Database 138 includes a buffer pool (hardware/software) structure 125 that includes a cache 110 for storing data pages 115. Sensors 112 may include any type of internal or external sensor (or biometric sensor) including, inter alia, ultrasonic three-dimensional sensor modules, an optical sensor, a video retrieval device, an audio retrieval device, humidity sensors, voltage sensors, a keyboard, a mouse, a touch screen, etc. Nodes 142a . . . 142n may include any type of hardware/software node structure. Database controller 139 and database 138 may each may comprise an embedded device. An embedded device is defined herein as a dedicated device or computer comprising a combination of computer hardware and software (fixed in capability or programmable) specifically designed for executing a specialized function. Programmable embedded computers or devices may comprise specialized programming interfaces. In one embodiment, database controller 139 and database 138 may each comprise a specialized hardware device comprising specialized (non-generic) hardware and circuitry (i.e., specialized discrete non-generic analog, digital, and logic-based circuitry) for (independently or in combination) executing a process described with respect to FIGS. 1-9. The specialized discrete non-generic analog, digital, and logic-based circuitry may include proprietary specially designed components (e.g., a specialized integrated circuit, such as for example an Application Specific Integrated Circuit (ASIC) designed for only implementing an automated process for improving database technology associated with enabling software functionality for ready and modifying data pages associated with a plurality of nodes with respect to a high performance cache structure of a buffer pool structure. Network 117 may include any type of network including, inter alia, a 5G telecom network, a local area network, (LAN), a wide area network (WAN), the Internet, a wireless network, etc. Alternatively, network 117 may include an application programming interface (API).

System 100 enables the following process for automatically enabling database reading functionality with respect to multiple hardware nodes 142a . . . 142n:

The process is initiated when database controller 139 registers data pages configured for reading by a first node (of nodes 142a . . . 142n) within buffer pool structure 125. In response, share lock functionality is enabled for allowing only the first node to modify the data pages. The first node is enabled to read the data pages. After the first node has completed reading the data pages, the share lock functionality is disabled. Subsequently, the said data pages are registered with respect to a second node (of nodes 142a . . . 142n) for writing functionality within buffer pool structure 125. A notification is generated and transmitted to the second node. The notification indicates that a group of data pages has expired with respect to a specified timeframe. Likewise, exclusive lock functionality is enabled to allow only the second node to read and modify the data pages. After the second node has completed modifying the data pages the exclusive lock functionality is disabled. Additionally, reading functionality for the first node and the second node to read the group of data pages from a high performance cache structure of the buffer pool structure is enabled.

Figure 2:
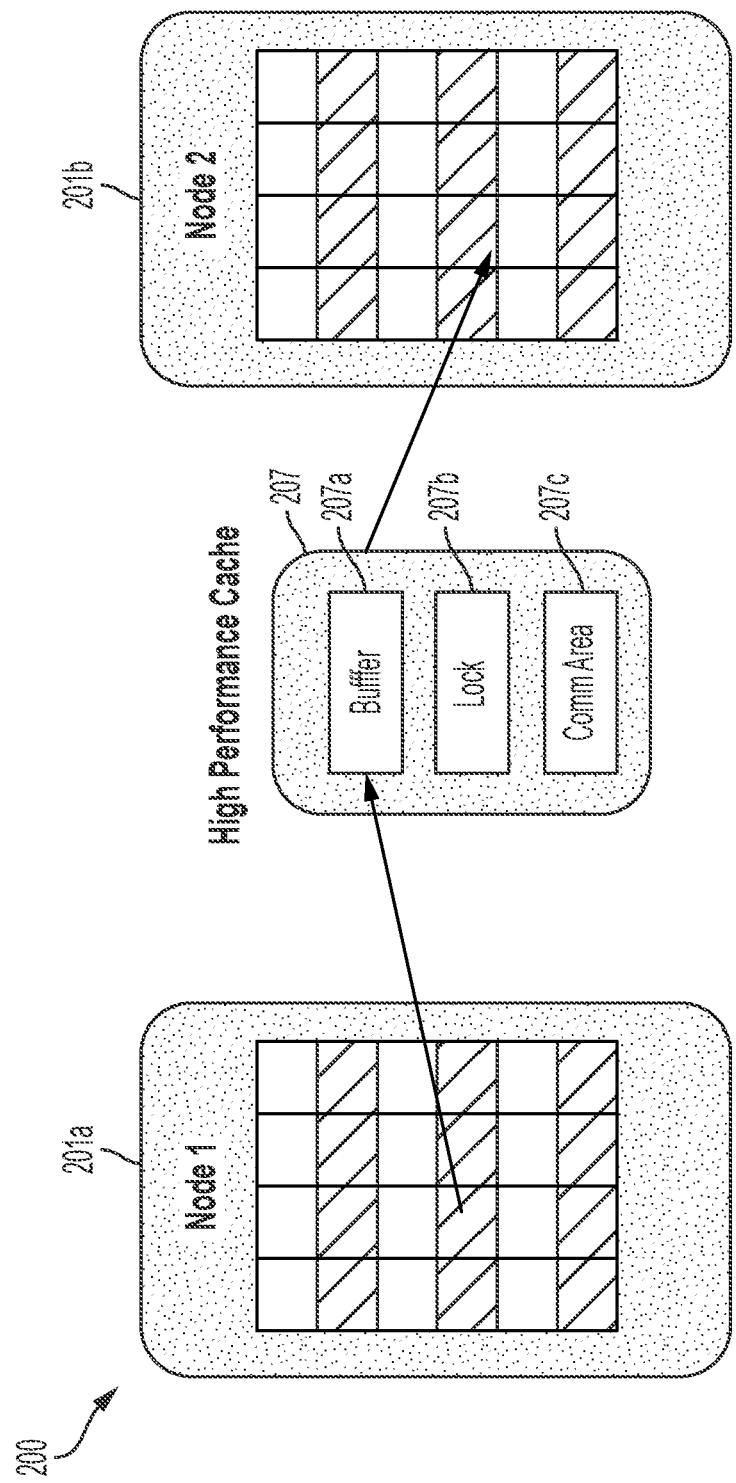
FIG. 2 illustrates a system comprising nodes connected to a high performance cache structure, in accordance with embodiments of the present invention.

FIG. 2 illustrates a system 200 comprising nodes 201a and 201b connected to a high performance cache 207, in accordance with embodiments of the present invention. High performance cache 207 comprises a buffer 207a, a lock structure 207b, and a common area 207c. Buffer 207a is configured to exchange operational records between nodes 201a and 201b. For example, when operational records are modified by a node, nodes 201a and 201b are configured to write a modified record into buffer 207a such that when additional nodes request the records, the additional nodes are enabled to read the modified records from buffer 207a. Lock structure 207b is configured to guarantee high consistency operation between nodes 207a and 207 b. For example, when more than one node is available to manipulate data, system 200 will guarantee a consistent record. Lock structure 207b is configured for conflict detection such that when a node performs a process for writing records, no read and write requests for the records are satisfied. Likewise, when a node reads the records, only the read requests are satisfied. Communication area 207c is configured to exchange information (between nodes 201a and 201b) such as, inter alia, notifications. Communication area 207c is configured to save the information such that system 200 is able to receive and transmit the information to additional nodes.

Figure 3:
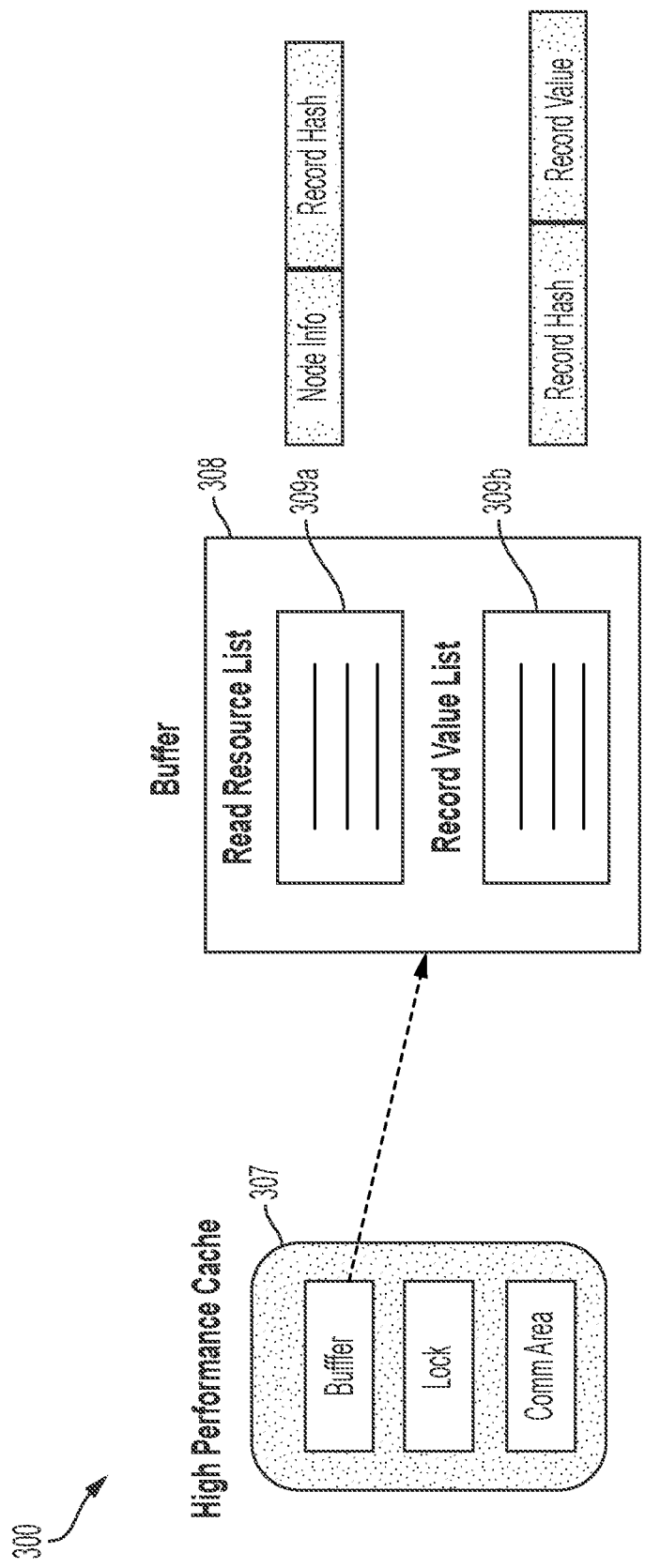
FIG. 3 illustrates a system comprising a high performance cache structure connected to a buffer structure, in accordance with embodiments of the present invention.

FIG. 3 illustrates a system 300 comprising a high performance cache structure 307 connected to a buffer structure 309, in accordance with embodiments of the present invention. Buffer structure 309 comprises a read resource list 309a and a record value list 309b. Read resource list 309a is configured for recording information associated with a node (including node info) with respect to a record such that nodes associated with interests are notified. A changed record value (associated with a record modified by a node) is recorded into a record value list. Read resource list 309a and record value list 309b are each organized with hash value (e.g. a record hash) for enabling a quick search function. A conflict may be reduced via execution of a hash process such as an SHA1 (secure hash algorithm 1) method for reducing a conflict ratio to $\frac{1}{2}\hat{}16$.

Figure 4:
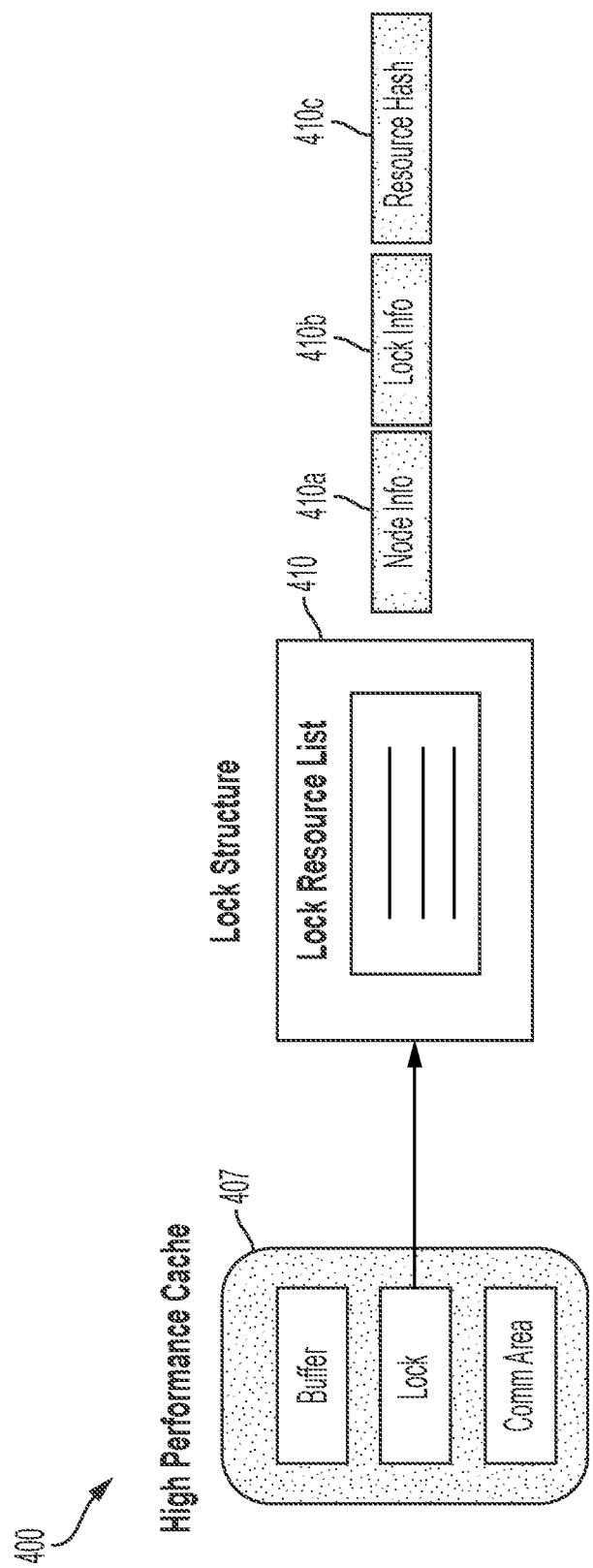
FIG. 4 illustrates a system comprising a high performance cache structure connected to a lock structure, in accordance with embodiments of the present invention.

FIG. 4 illustrates a system 400 comprising a high performance cache structure 407 connected to a lock structure 410, in accordance with embodiments of the present invention. Lock Structure includes a lock resource list comprising entries including node information 410a, lock information 410b, and a resource hash value 410c. The node information 410a is configured to record information associated with a node comprising interest with respect to a resource. The lock information 410b is configured to record information associated with a description of a status of resources and nodes. The resource hash value 410c comprises information associated with a resource such that portions of the information are configured to record a lock type (e.g., read, write, etc.) within a wait node list comprising additional nodes interested in a same resource.

Figure 5:
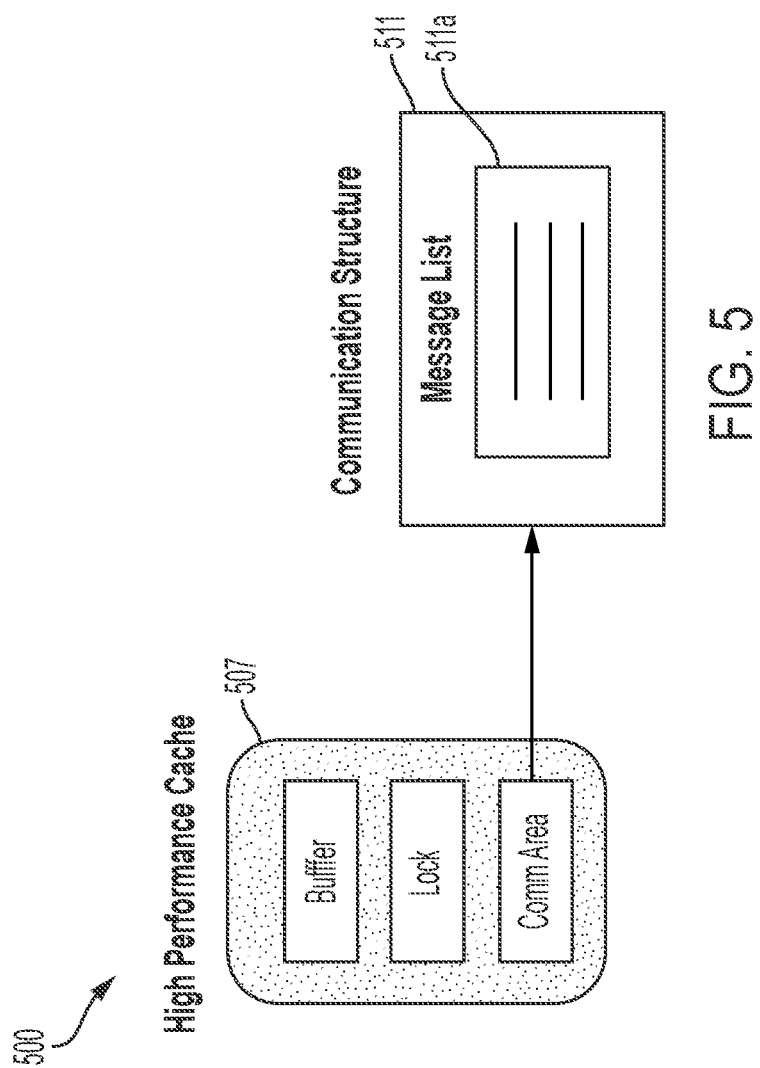
FIG. 5 illustrates a system comprising a high performance cache connected to a communication structure, in accordance with embodiments of the present invention.

FIG. 5 illustrates a system 500 comprising a high performance cache 507 connected to a communication structure 511, in accordance with embodiments of the present invention. Communication structure 511 comprises a message list 511a including node information, resource information, and a message ID. The node information is configured to record information associated with a node to be notified. Resource information includes information associated with a resource that may be requested by additional nodes. A message ID includes a unique identify for a message to ensure that the message is not duplicated. Communication structure 511 may be used for scenarios requiring communication such as, inter alia, a create/alter table, a create/alter Index, a reorg table, etc.

Figure 6:
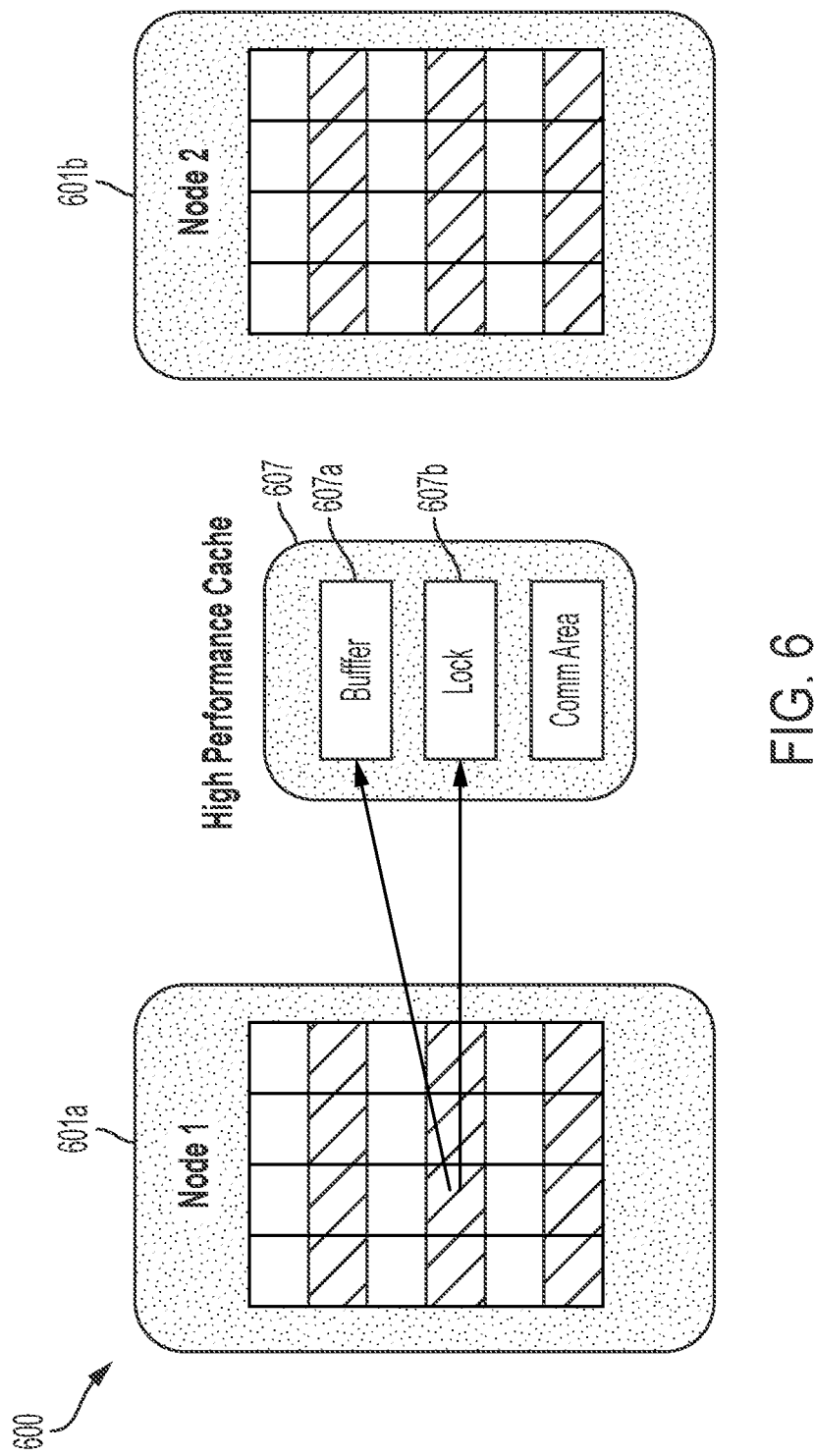
FIG. 6 illustrates a system comprising nodes for enabling a resource management process, in accordance with embodiments of the present invention.

FIG. 6 illustrates a system 600 comprising a node 601a and a node 601b for enabling a resource management process, in accordance with embodiments of the present invention. The resource management process enables a node 601a to read and record a record within a buffer read resource list within a buffer 607a of a high performance cache 607. During the read duration, node 601a retains the record within a lock list (of a lock structure 607b) for read lock functionality. After reading the record, node 601a releases lock functionality within the lock list. The following process illustrates an implementation example for enabling a resource management process:

The process is initiated when pages are registered for reading within a buffer pool. The buffer pool comprises a buffer read resource list for registering the pages associated with the node read within the buffer pool. A resulting registration record enables a process such that when additional nodes update pages within the buffer a read resource list, the originating node is notified and associated pages are refreshed. The registration record may include information comprising: a node ID (an identity for the node), a DBID (an identity for the database), an OBID (an identity for the database object), a page number (an identity number for the page in a database object), a status (read or write), etc. The registration record enables the high performance cache to record nodes referring to specified pages. Additionally, a share lock is required for the pages such that during a reading duration, alternative nodes are prevented from modifying the pages. The original node requires a share lock for all pages being read. The share lock allows additional nodes to read a page but does not allow additional nodes to modify the pages. The lock structure records statuses associated with the pages and blocks requirements for updating the pages. Subsequently, the share lock is released for the pages such that after reading the pages, the node releases the share lock for the pages within lock structure 607b and allows additional nodes to modify the pages. Likewise, the register record in buffer 607a reads the stored resource list to indicate that the pages are still within the local buffer pool.

Figure 7:
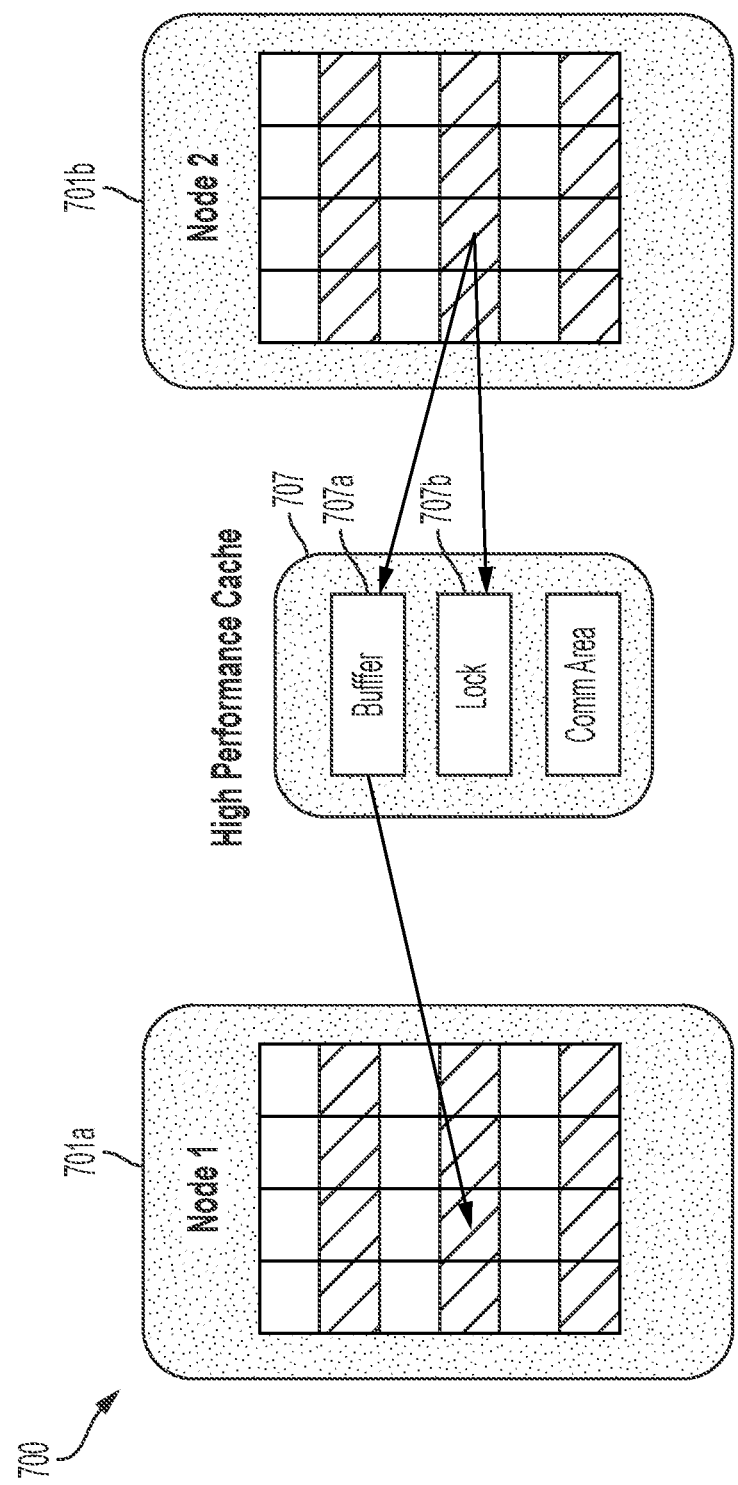
FIG. 7 illustrates a system for enabling a response resource management process, in accordance with embodiments of the present invention.

FIG. 7 illustrates a system 700 for enabling a response resource management process, in accordance with embodiments of the present invention. The response resource management process enables a node 701b to update and record a record within the buffer write resource list. Subsequently, a buffer management module notifies node 701a that the record is out of time. During a read duration, node 701b retains the record within a lock list for write lock functionality. Therefore, if node 701b requests to read the record, node 701a will retrieve the record from a buffer structure 707a of a high performance cache 707. The following process illustrates an implementation example for enabling a write process:

The process is initiated when pages are registered for writing within a buffer pool. The pages written by the nodes are recorded and the nodes that retained the pages are notified. Each page is written such that the nodes caching pages are notified that the retained pages are flagged as invalid thereby guaranteeing that the nodes do not retain pages that are out of time. During a writing duration, additional nodes are disabled from reading and modifying pages. The original node requires an exclusive lock function for pages during a writing process. The exclusive lock function is configured to block reading and writing requirements with respect to the pages thereby guaranteeing consistent operation with respect to processing the pages. After pages are written, the original node releases the exclusive lock function from pages within the lock structure thereby allowing additional nodes to read and write to the pages. A resulting register record is stored within a buffer read resource list for indicating pages are modified by the original node. If pages are marked as invalid within the additional nodes, the additional nodes will read the pages from buffer structure 707a before reading or writing to ensure that the pages are consistent.

Figure 8:
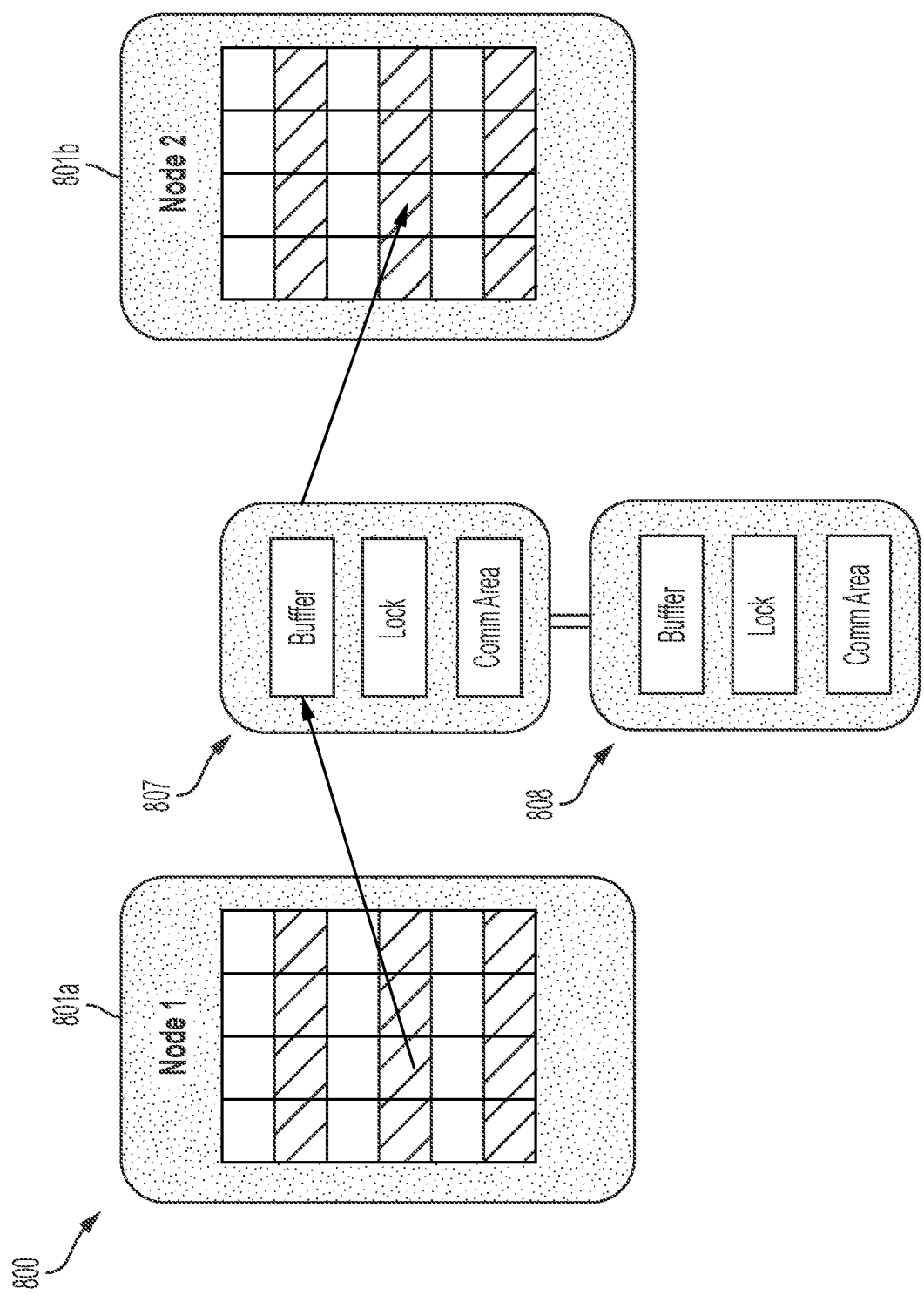
FIG. 8 illustrates a system for reducing a risk for system malfunction if a high performance cache structure is detected as invalid, in accordance with embodiments of the present invention.

FIG. 8 illustrates a system 800 for reducing a risk for system malfunction if a high performance cache structure 807 is detected as invalid, in accordance with embodiments of the present invention. The process is initiated when a secondary high performance cache structure 808 retrieves a copy of information from a primary high performance cache structure 807. Subsequently, buffer and lock register processes indicate a success message with respect to the information retrieval thereby guaranteeing that the information in the cache structure 807 and 808 are the same. Therefore, when the primary high performance cache 807 is detected as invalid due to a malfunction, secondary high performance cache 808 maintains control of system 800. Secondary high performance cache 808 is configured to notify all connected nodes (e.g., nodes 801a and 801b) to connect to secondary high performance cache 808 during the malfunction. When the malfunction has been resolved, nodes 801a and 801b receive a notification for reconnecting to primary high performance cache 807.

Figure 9:
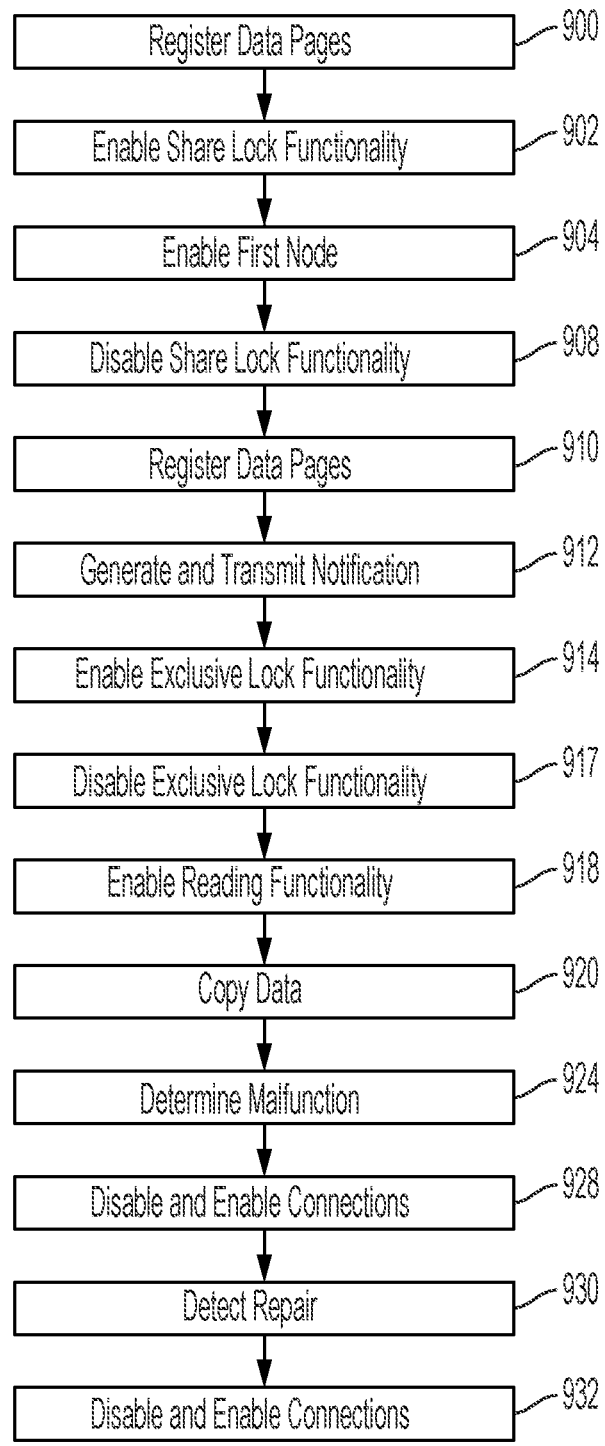
FIG. 9 illustrates an algorithm detailing a process flow enabled by the system of FIG. 1 for improving database technology associated with enabling software functionality for ready and modifying data pages associated with a plurality of nodes with respect to a high performance cache structure of a buffer pool structure, in accordance with embodiments of the present invention.

FIG. 9 illustrates an algorithm detailing a process flow enabled by the system of FIG. 1 for improving database technology associated with enabling software functionality for ready and modifying data pages associated with a plurality of nodes with respect to a high performance cache structure of a buffer pool structure, in accordance with embodiments of the present invention. Each of the steps in the algorithm of FIG. 9 may be enabled and executed in any order by a computer processor(s) executing computer code. Additionally, each of the steps in the algorithm of FIG. 9 may be enabled and executed in combination by database controller 139 and database 138. In step 900, data pages are registered by a database controller. The data pages configured for reading by a first node (of a plurality of nodes) within a buffer pool structure of a database. Registering the data pages may include generating: a register record comprising an identity for the first node, an identity for the database, an identity for an object of the database, an identity for a page of the data pages within the object, and a read or write status of the first node.

In step 902, share lock functionality is enabled. The share lock functionality is configured to allow only the first node to modify the data pages. Enabling the share lock functionality may include recording statuses associated with the data pages with respect to blocking modification of the data pages. In step 904, the first node is enabled to read the data pages. In step 908 (after the first node has completed reading the data pages), the share lock functionality is disabled. In step 910, the data pages are registered with respect to a second node (of the plurality of nodes) for writing functionality within the buffer pool structure. Registering the data pages with respect to the second node may include recording specified pages of the data pages that have been modified with respect to the writing functionality within the buffer pool structure.

In step 912, a notification is generated. The notification indicates that a group of data pages has expired with respect to a specified timeframe. The notification is transmitted to the second node. In step 914, exclusive lock functionality is enabled. The exclusive lock functionality is configured to allow only the second node to read and modify the data pages. In step 917 (after the second node has completed modifying the data pages), the exclusive lock functionality is disabled. Disabling the exclusive lock functionality may include storing a register record indicating pages of the data pages that have been modified by the first node.

In step 918, reading functionality for the first node and second node is enabled. The reading functionality enables the first node and second node to read the group of data pages from a high performance cache structure of the buffer pool structure. In step 920, data is copied from the high performance cache structure to a backup high performance cache structure. In step 924, it is determined that the high performance cache structure is currently malfunctioning. In step 928, connections between the high performance cache structure and the plurality of nodes are disabled in response to results of step 924. Additionally, connections between the backup high performance cache structure and the plurality of nodes are enabled. In step 930, it is determined that the high performance cache structure has been repaired. In step 932, connections between the backup high performance cache structure and the plurality of nodes are disabled in response to results of step 930. Additionally, connections between the high performance cache structure and the plurality of nodes are enabled.

Figure 10:
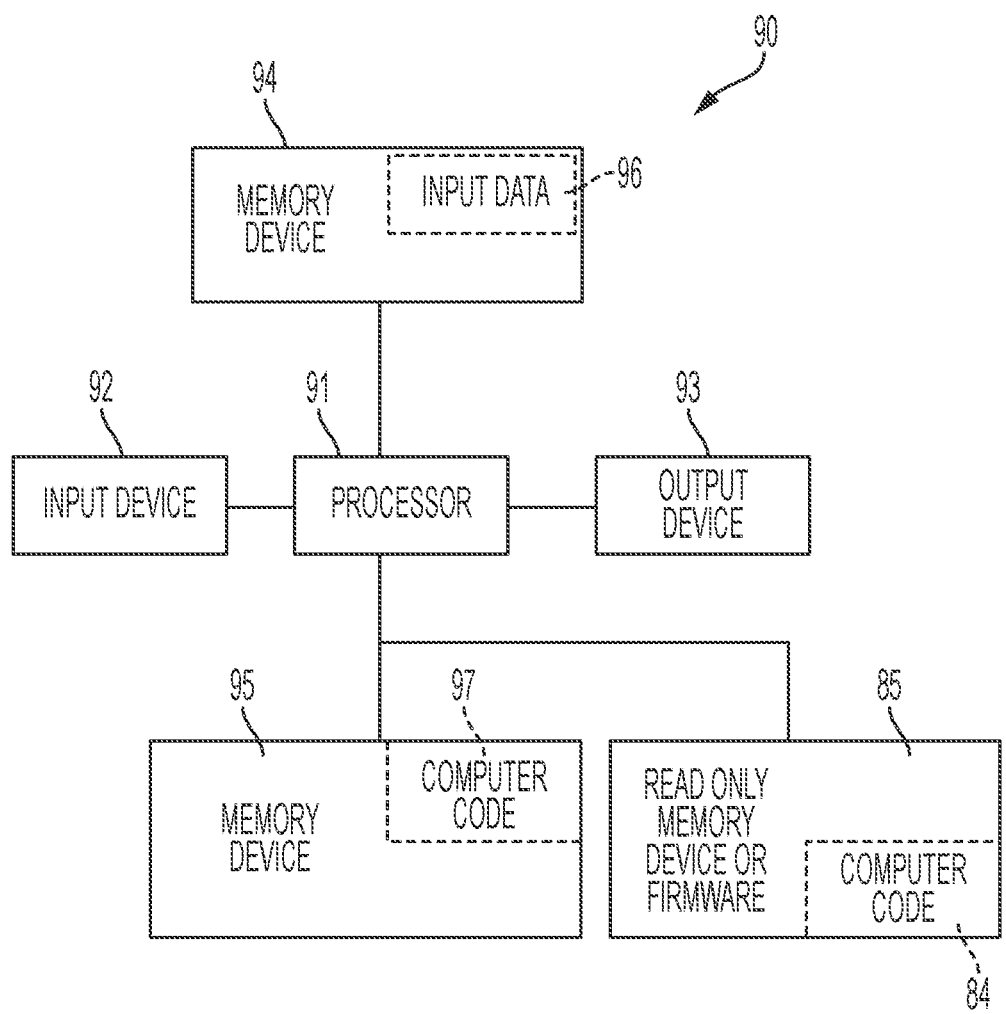
FIG. 10 illustrates a computer system used by the system of FIG. 1 for improving database technology associated with enabling software functionality for ready and modifying data pages associated with a plurality of nodes with respect to a high performance cache structure of a buffer pool structure, in accordance with embodiments of the present invention.

FIG. 10 illustrates a computer system 90 (e.g., database controller 139 and/or database 138 of FIG. 1) used by or comprised by the system of FIG. 1 for improving database technology associated with enabling software functionality for ready and modifying data pages associated with a plurality of nodes with respect to a high performance cache structure of a buffer pool structure, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 10 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random-access memory (DRAM), a read-only memory (ROM), etc. The memory device 95 includes a computer code 97. The computer code 97 includes algorithms (e.g., the algorithm of FIG. 9) for improving database technology associated with enabling software functionality for ready and modifying data pages associated with a plurality of nodes with respect to a high performance cache structure of a buffer pool structure. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices such as Read-Only Memory (ROM) device or firmware 85) may include algorithms (e.g., the algorithm of FIG. 9) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithms) may be stored on a static, nonremovable, read-only storage medium such as ROM device or firmware 85, or may be accessed by processor 91 directly from such a static, nonremovable, read-only medium. Similarly, in some embodiments, stored computer program code 97 may be stored as ROM device or firmware 85, or may be accessed by processor 91 directly from such ROM device or firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve database technology associated with enabling software functionality for ready and modifying data pages associated with a plurality of nodes with respect to a high performance cache structure of a buffer pool structure. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving database technology associated with enabling software functionality for ready and modifying data pages associated with a plurality of nodes with respect to a high performance cache structure of a buffer pool structure. In another embodiment, the invention provides a business method that performs the process steps of the invention on a subscription, advertising, and/or fee basis. That is, a service supplier, such as a Solution Integrator, could offer to enable a process for improving database technology associated with enabling software functionality for ready and modifying data pages associated with a plurality of nodes with respect to a high performance cache structure of a buffer pool structure. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 10 shows the computer system 90 as a configuration of hardware and software, any configuration of hardware and software, as would be known to a person of ordinary skill in the art, may be utilized for the purposes stated supra in conjunction with the computer system 90 of FIG. 10. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 11:
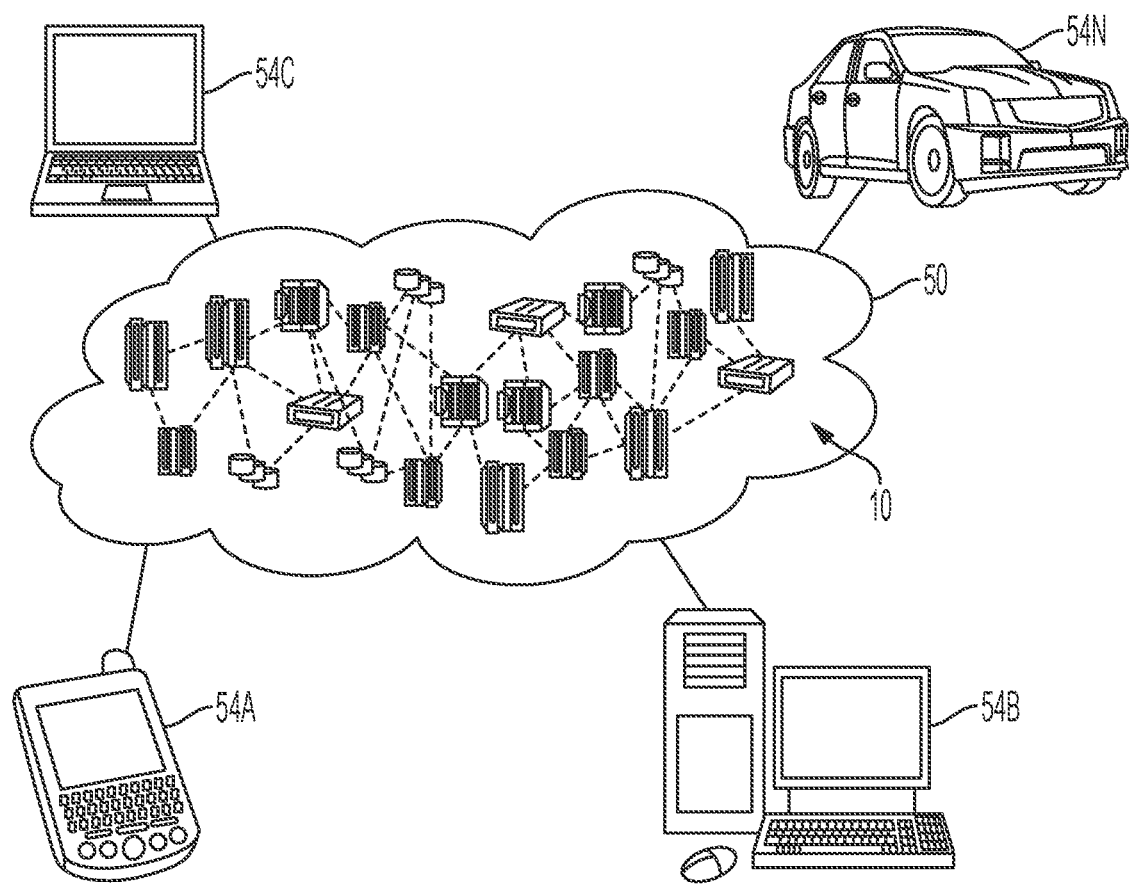
FIG. 11 illustrates a cloud computing environment, in accordance with embodiments of the present invention.

Referring now to FIG. 11, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 11 are intended to be illustrative only and that computing nodes 10 and cloud computing environment 50 can communicate with any type of computerized device over any type of network and/or network addressable connection (e.g., using a web browser).

Figure 12:
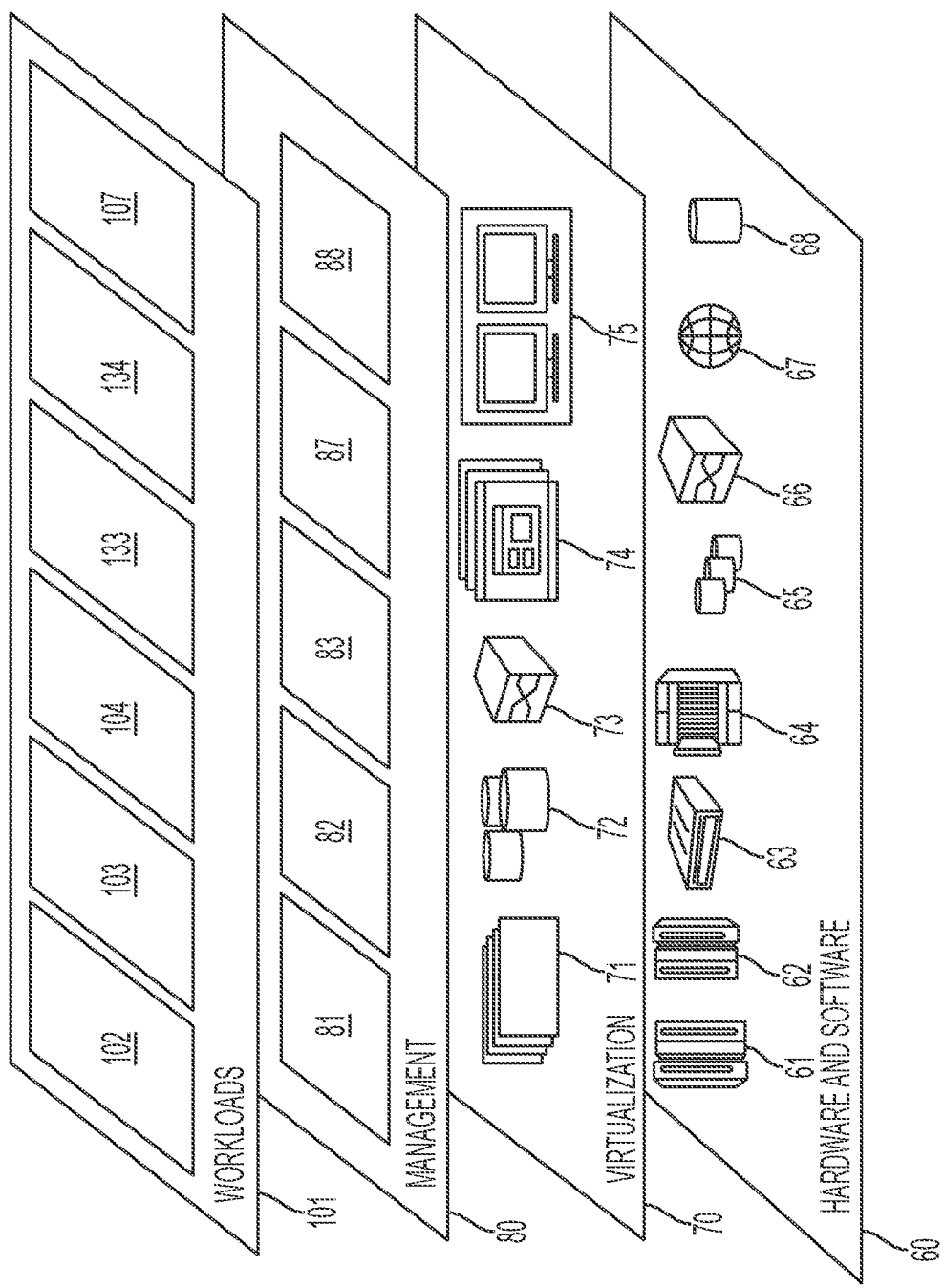
FIG. 12 illustrates a set of functional abstraction layers provided by cloud computing environment, in accordance with embodiments of the present invention.

Referring now to FIG. 12, a set of functional abstraction layers provided by cloud computing environment 50 (see FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 87 provides cloud computing resource allocation and management such that required service levels are met. Service Level Agreement (SLA) planning and fulfillment 88 provide pre-arrangement for, and procurement of, cloud computing resources for which a future requirement is anticipated in accordance with an SLA.

Workloads layer 101 provides examples of functionality for which the cloud computing environment may be utilized. Examples of workloads and functions which may be provided from this layer include: mapping and navigation 102; software development and lifecycle management 103; virtual classroom education delivery 133; data analytics processing 134; transaction processing 106; and improving database technology associated with enabling software functionality for ready and modifying data pages associated with a plurality of nodes with respect to a high performance cache structure of a buffer pool structure 107.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A high performance multi-write database modification method comprising:
   registering, by a processor of a database controller, data pages configured for reading by a first node of plurality of nodes within a buffer pool structure of a database;
   enabling, by said processor, share lock functionality configured to allow only said first node to modify said data pages;
   enabling, by processor, said first node to read said data pages;
   after said first node has completed reading said data pages, disabling by said processor, said share lock functionality;
   registering, by said processor, said data pages with respect to a second node of said plurality of nodes for writing functionality within said buffer pool structure;
   generating, by said processor, a notification indicating that a group of data pages of said data pages has expired with respect to a specified timeframe;
   transmitting, by said processor to said second node, said notification;
   enabling, by said processor, exclusive lock functionality configured to allow only said second node to read and modify said data pages;
   after said second node has completed modifying said data pages, disabling by said processor, said exclusive lock functionality; and
   enabling, by said processor, reading functionality for said first node and said second node to read said group of data pages from a high performance cache structure of said buffer pool structure.

2. The method of claim 1, further comprising:
   copying, by said processor, data from said high performance cache structure to a backup high performance cache structure;
   determining, by said processor, that said high performance cache structure is currently malfunctioning;
   disabling, by said processor in response to results of said determining, connections between said high performance cache structure and said plurality of nodes; and
   enabling, by said processor in response to results of said determining, connections between said backup high performance cache structure and said plurality of nodes.

3. The method of claim 2, further comprising:
   determining, by said processor, that said high performance cache structure has been repaired;
   disabling, by said processor in response to results of said determining, connections between said backup high performance cache structure and said plurality of nodes; and enabling, by said processor in response to results of said determining, connections between said high performance cache structure and said plurality of nodes.

4. The method of claim 1, wherein said registering said data pages for reading said first node comprises generating a register record comprising an identity for said first node, an identity for said database, an identity for an object of said database, an identity for a page of said data pages within said object, and a read or write status of said first node.

5. The method of claim 1, wherein said enabling said share lock functionality comprises recording statuses associated with said data pages with respect to blocking modification of said data pages.

6. The method of claim 1, wherein said registering said data pages with respect to said second node comprises recording specified pages of said data pages that have been modified with respect to said writing functionality within said buffer pool structure.

7. The method of claim 1, wherein said disabling said exclusive lock functionality comprises storing a register record indicating pages of said data pages that have been modified by said first node.

8. The method of claim 1, further comprising:
providing at least one support service for at least one of creating, integrating, hosting, maintaining, and deploying computer-readable code in the database controller, said code being executed by the computer processor to implement: said registering said data pages configured for reading said first node, said enabling said share lock functionality, said enabling said first node, said disabling said share lock functionality, said registering said data pages with respect to said second node, said generating, said transmitting, said enabling said exclusive lock functionality, said disabling said exclusive lock functionality, and said enabling said reading functionality.

9. A computer program product, comprising a computer readable hardware storage device storing a computer readable program code, said computer readable program code comprising an algorithm that when executed by a processor of a database controller implements a high performance multi-write database modification method, said method comprising:
registering, by said processor, data pages configured for reading by a first node of plurality of nodes within a buffer pool structure of a database;
enabling, by said processor, share lock functionality configured to allow only said first node to modify said data pages;
enabling, by processor, said first node to read said data pages;
after said first node has completed reading said data pages, disabling by said processor, said share lock functionality;
registering, by said processor, said data pages with respect to a second node of said plurality of nodes for writing functionality within said buffer pool structure;
generating, by said processor, a notification indicating that a group of data pages of said data pages has expired with respect to a specified timeframe;
transmitting, by said processor to said second node, said notification;
enabling, by said processor, exclusive lock functionality configured to allow only said second node to read and modify said data pages;
after said second node has completed modifying said data pages, disabling by said processor, said exclusive lock functionality; and
enabling, by said processor, reading functionality for said first node and said second node to read said group of data pages from a high performance cache structure of said buffer pool structure.

10. The computer program product of claim 9, wherein said method further comprises:
copying, by said processor, data from said high performance cache structure to a backup high performance cache structure;
determining, by said processor, that said high performance cache structure is currently malfunctioning;
disabling, by said processor in response to results of said determining, connections between said high performance cache structure and said plurality of nodes; and
enabling, by said processor in response to results of said determining, connections between said backup high performance cache structure and said plurality of nodes.

11. The computer program product of claim 10, wherein said method further comprises:
determining, by said processor, that said high performance cache structure has been repaired;
disabling, by said processor in response to results of said determining, connections between said backup high performance cache structure and said plurality of nodes; and
enabling, by said processor in response to results of said determining, connections between said high performance cache structure and said plurality of nodes.

12. The computer program product of claim 9, wherein said registering said data pages for reading said first node comprises generating a register record comprising an identity for said first node, an identity for said database, an identity for an object of said database, an identity for a page of said data pages within said object, and a read or write status of said first node.

13. The computer program product of claim 9, wherein said enabling said share lock functionality comprises recording statuses associated with said data pages with respect to blocking modification of said data pages.

14. The computer program product of claim 9, wherein said registering said data pages with respect to said second node comprises recording specified pages of said data pages that have been modified with respect to said writing functionality within said buffer pool structure.

15. The computer program product of claim 9, wherein said disabling said exclusive lock functionality comprises storing a register record indicating pages of said data pages that have been modified by said first node.

16. A database controller comprising a processor coupled to a computer-readable memory unit, said memory unit comprising instructions that when executed by the processor implements a high performance multi-write database modification method comprising:
registering, by said processor, data pages configured for reading by a first node of plurality of nodes within a buffer pool structure of a database;
enabling, by said processor, share lock functionality configured to allow only said first node to modify said data pages;
enabling, by processor, said first node to read said data pages;

after said first node has completed reading said data pages, disabling by said processor, said share lock functionality;

registering, by said processor, said data pages with respect to a second node of said plurality of nodes for writing functionality within said buffer pool structure;

generating, by said processor, a notification indicating that a group of data pages of said data pages has expired with respect to a specified timeframe;

transmitting, by said processor to said second node, said notification;

enabling, by said processor, exclusive lock functionality configured to allow only said second node to read and modify said data pages;

after said second node has completed modifying said data pages, disabling by said processor, said exclusive lock functionality; and enabling, by said processor, reading functionality for said first node and said second node to read said group of data pages from a high performance cache structure of said buffer pool structure.

17. The database controller of claim 16, wherein said method further comprises:

copying, by said processor, data from said high performance cache structure to a backup high performance cache structure;

determining, by said processor, that said high performance cache structure is currently malfunctioning;

disabling, by said processor in response to results of said determining, connections between said high performance cache structure and said plurality of nodes; and enabling, by said processor in response to results of said determining, connections between said backup high performance cache structure and said plurality of nodes.

18. The database controller of claim 17, wherein said method further comprises:

determining, by said processor, that said high performance cache structure has been repaired;

disabling, by said processor in response to results of said determining, connections between said backup high performance cache structure and said plurality of nodes; and enabling, by said processor in response to results of said determining, connections between said high performance cache structure and said plurality of nodes.

19. The database controller of claim 16, wherein said registering said data pages for reading said first node comprises generating a register record comprising an identity for said first node, an identity for said database, an identity for an object of said database, an identity for a page of said data pages within said object, and a read or write status of said first node.

20. The database controller of claim 16, wherein said enabling said share lock functionality comprises recording statuses associated with said data pages with respect to blocking modification of said data pages.

* * * * *